United States Patent
Hunter (10) Patent No.: US 9,874,304 B1
(45) Date of Patent: Jan. 23, 2018

(54) TRAVEL MEDIA STAND

(71) Applicant: Jennifer Hunter, Minot, ND (US)

(72) Inventor: Jennifer Hunter, Minot, ND (US)

(*) Notice: Subject to any disclaimer, the term of this patent is extended or adjusted under 35 U.S.C. 154(b) by 0 days.

(21) Appl. No.: 15/590,538

(22) Filed: May 9, 2017

(51) Int. Cl.
| | |
|---|---|
| A47F 5/00 | (2006.01) |
| A47B 19/00 | (2006.01) |
| A47B 97/00 | (2006.01) |
| F16M 13/02 | (2006.01) |
| F16M 11/08 | (2006.01) |
| F16M 11/38 | (2006.01) |
| A47F 5/08 | (2006.01) |
| F16M 11/20 | (2006.01) |
| A47F 5/10 | (2006.01) |

(52) U.S. Cl.
CPC ........... *F16M 11/38* (2013.01); *A47F 5/0815* (2013.01); *A47F 5/0876* (2013.01); *A47B 19/002* (2013.01); *A47F 5/08* (2013.01); *A47F 5/108* (2013.01); *F16M 11/20* (2013.01)

(58) Field of Classification Search
CPC ....... F16M 11/38; F16M 11/20; A47F 5/0815; A47F 5/0876; A47F 5/08; A47F 5/108
USPC .... 248/690, 441.1, 160, 166, 214, 215, 322, 248/339, 340, 188.2, 188.6; 108/4, 44, 108/115
See application file for complete search history.

(56) References Cited

U.S. PATENT DOCUMENTS

| | | | | |
|---|---|---|---|---|
| 327,816 | A * | 10/1885 | Newbourg | A47B 23/042 248/460 |
| 348,706 | A * | 9/1886 | Weiner | A47B 19/08 108/115 |
| 5,813,354 | A * | 9/1998 | Scott | B60N 3/004 108/44 |
| 6,505,797 | B1 * | 1/2003 | Dempsey | F16M 13/00 248/166 |
| 6,590,767 | B2 * | 7/2003 | Liao | G06F 1/1632 248/917 |
| 7,364,129 | B1 * | 4/2008 | Levari, Jr. | A45C 13/00 108/4 |
| 7,533,860 | B2 | 5/2009 | Somuah | |
| 8,240,626 | B2 | 8/2012 | Kennedy | |
| 8,424,825 | B2 | 4/2013 | Somuah | |

(Continued)

OTHER PUBLICATIONS

Korea Design Portable Stand Reading Holder Fashion Book Bookend Folding Tablet Tablature; https://www.aliexpress.com/item/Korea-Design-Portable-Stand-Reading-Holder-Fashion-Book-Bookend-Folding-Tablet-Tablature/32796342526.html?spm=2114.40010508.4.7.cPs4FW&s=p; accessed on Mar. 10, 2017.

(Continued)

*Primary Examiner* — Tan Le
(74) *Attorney, Agent, or Firm* — Stinson Leonard Street LLP (57) ABSTRACT

A travel media stand including a base with a first end and a second end, a mount coupled to the first end of the base, and a holder coupled to the second end of the base. A longitudinal axis of the base extends from the first end to the second end. The base is movable between an extended position and a retracted position. The mount is rotatable with respect to the base around a mount axis that is generally parallel to the longitudinal axis, and the holder is also rotatable with respect to the base around a holder axis that is generally parallel to the longitudinal axis. The mount may mount to or hang from an item, and the holder may hold or retain an item.

22 Claims, 7 Drawing Sheets

(56) References Cited

U.S. PATENT DOCUMENTS 9,062,821 B2 * 6/2015 Jensen ................. F16M 11/041
9,408,456 B2 * 8/2016 Hart ........................ A45F 5/021

OTHER PUBLICATIONS

That Company called if Travel Book Rest Folding Stand, Red; https://www.amazon.co.uk/That-Company-called-Travel-Folding/dp/B00YP3L728; accessed on Mar. 10, 2017.
Universal Foldable Auto Truck Car Laptop Stand AirDesk Car Seat/Steering Wheel Netbook Tray Table Food/drink Holder/Mounts; https://www.ldgate.com/product/universal-foldable-auto-truck-car-laptop-stand-airdesk-car-seatsteering-wheel-netbook-tray-table-food-drink-holder-mounts.html; accessed on Mar. 10, 2017.
Hipsteen 10Pcs Magic Movable Plastic Hanger Rack with 2 Adjustable Hooks 5 Holes drying Clothes Scarves Suit Trousers in Closet; https://www.aliexpress.com/store/product/10Pcs-Set-Magic-Movable-Plasic-Hanger-Rack-with-2-Adjustable-Hooks-5-Holes-for-drying-Clothes/612807_32416721510.html; accessed on Mar. 10, 2017.

* cited by examiner

TRAVEL MEDIA STAND

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a media holder or stand and, more particularly, to a portable, travel media stand.

2. Description of Related Art

Different types of media stands and holders are available for the hands free display of media such as books, mobile phones, and tablets. For example, there are book, tablet, and mobile phone holders that are placed on a flat surface, such as a table top, and that support the book, tablet, or mobile phone at an angle relative to the flat surface for viewing and use. These types of holders may fold between a relatively flat position for transport and a triangular position for holding the book, tablet, or mobile phone. There are also different types of mobile phone holders that are sized to receive a particular type of mobile phone and to mount or hang the mobile phone to an item such as a belt loop. Existing media stands and holders are generally not adapted to have a compact position for storage and transport, capable of mounting to a variety of different types of items, and capable of holding a variety of different types of media and mobile devices.

BRIEF SUMMARY OF THE INVENTION

One embodiment of the invention described herein is directed to a travel media stand including a base with a first end and a second end, a mount coupled to the first end of the base, and a holder coupled to the second end of the base. A longitudinal axis of the base extends from the first end to the second end. The base is movable between an extended position and a retracted position. The mount is rotatable with respect to the base around a mount axis that is generally parallel to the longitudinal axis, and the holder is also rotatable with respect to the base around a holder axis that is generally parallel to the longitudinal axis. Preferably, the mount may mount to or hang from an item such as exercise equipment, a chair, a cabinet door, a door, or a seatback pocket. Preferably, the holder may hold or retain an item such as a laptop computer, a mobile phone, a tablet, an e-reader, a book, a magazine, or a newspaper. The base moves from the extended position, in which the travel media stand is suitably sized for holding or retaining an item, to the retracted position, in which the base is preferably in a compact size and shape suitable for transport and storage. The mount rotates with respect to the base so that the travel media stand may be mounted to or hung from a variety of different items in different positions as desired by the user. The holder rotates with respect to the base so that the travel media stand may hold and support media of different sizes for display and use.

The base preferably includes top, middle, and bottom sections. As the base moves from the retracted position to the extended position, the base is preferably unfolded by rotating the middle section with respect to the top section and by rotating the bottom section with respect to the middle section. Alternatively, the base may include top and bottom sections that slide relative to each other as the base moves from the retracted position to the extended position. In the retracted position, the base preferably has a height, or distance from the first end to the second end, that is less than the height of the base when the base is in the extended position.

Preferably, the mount includes first and second mount hooks each coupled to the first end of the base. The first and second mount hooks are rotatable with respect to the base around first and second mount axes, respectively, that are generally parallel to the longitudinal axis of the base. Each of the first and second mount hooks is preferably rotatable approximately 180 degrees with respect to the base between a front position in which it extends outward from a front of the base, a side position in which it extends outward from a side of the base, and a rear position in which it extends outward from a rear of the base. Preferably, the holder includes first and second holder hooks each coupled to the second end of the base. The first and second holder hooks are rotatable with respect to the base around first and second holder axes, respectively, that are generally parallel to the longitudinal axis of the base. Each of the first and second holder hooks is preferably rotatable approximately 90 degrees with respect to the base between a side position in which it extends outward from a side of the base and a front position in which it extends outward from a front of the base.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
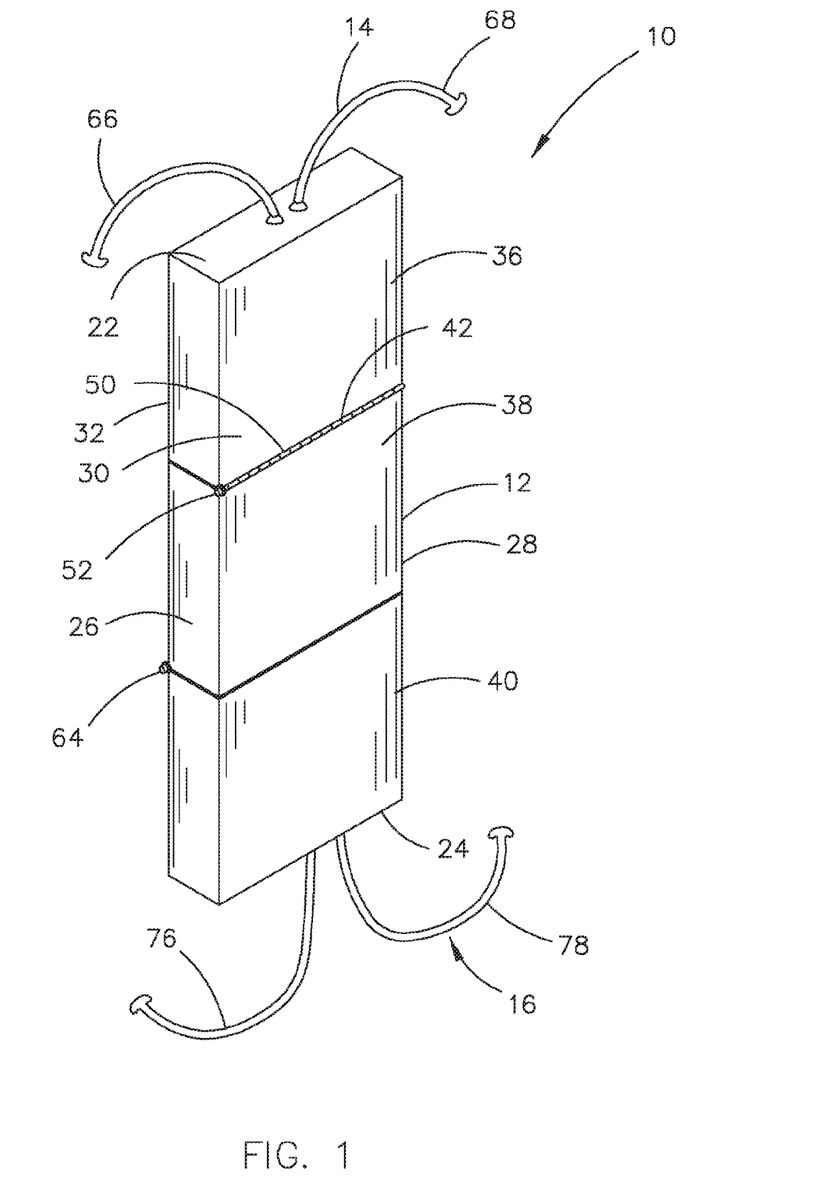
FIG. 1 is a perspective view of a travel media stand in accordance with one embodiment of the invention described herein showing it in an extended position.
Figure 5:
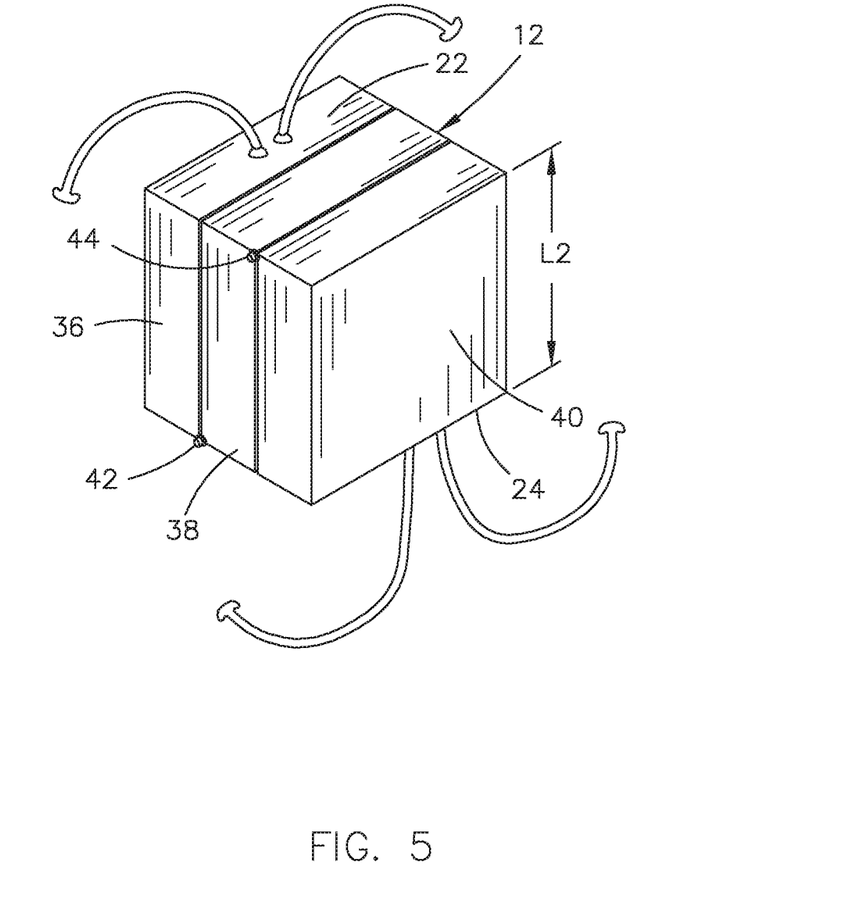
FIG. 5 is a perspective view of the travel media stand of FIG. 1 showing it in a retracted position for storage.
Figure 6:
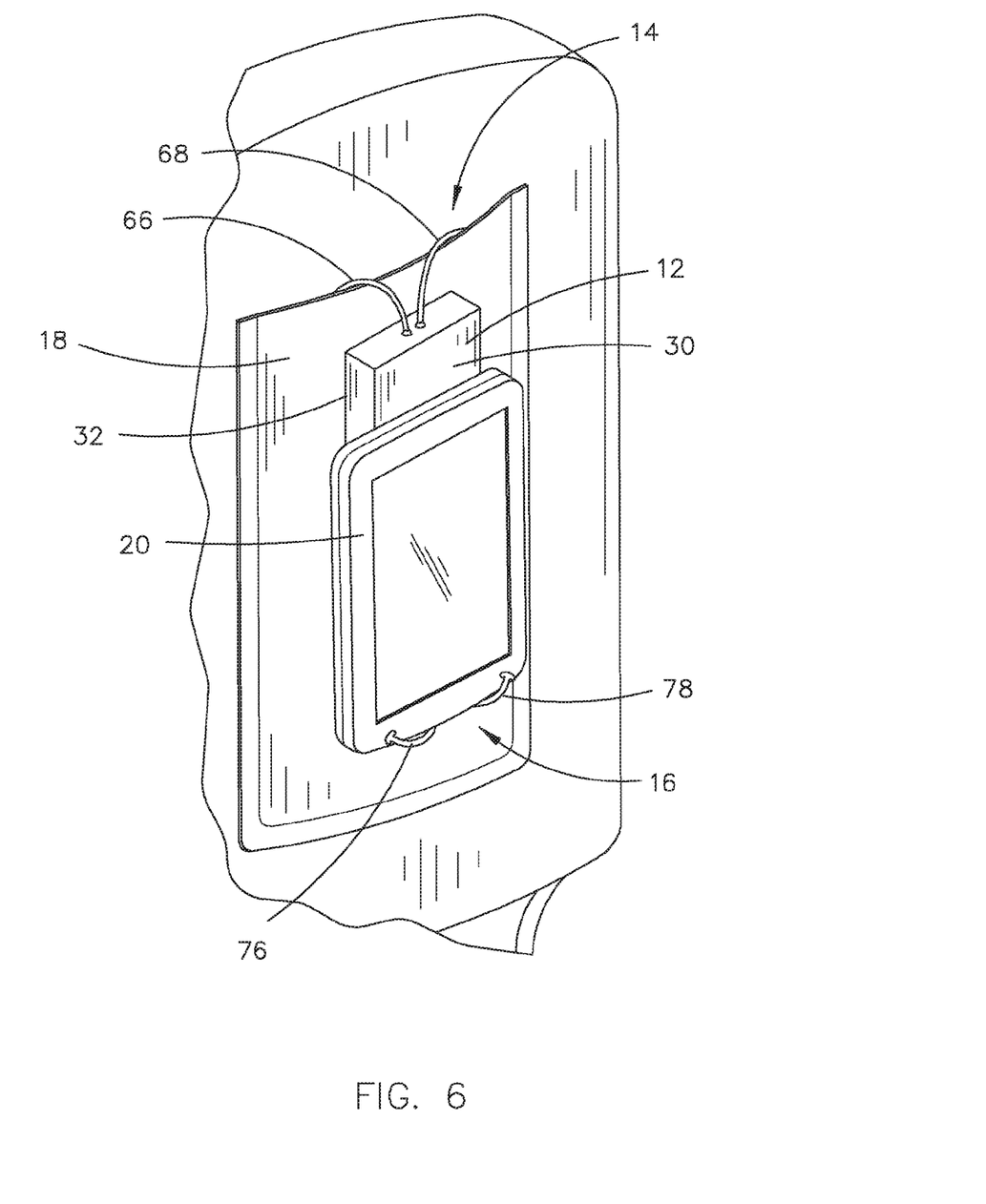
FIG. 6 is a perspective view of the travel media stand of FIG. 1 showing it hanging from a seat back pocket and holding a media device.

A travel media stand in accordance with one embodiment of the invention described herein is identified generally in FIG. 1 as 10. Travel media stand 10 includes a base 12, a mount 14, and a holder 16. Base 12 is moveable between the extended position shown in FIG. 1 and the retracted position shown in FIG. 5. In the extended position, as shown in FIG. 6, mount 14 can mount to or hang from an item such as an airplane seatback pocket 18, and holder 16 can hold media such as a mobile phone 20 for display and use. In the retracted position, as shown in FIG. 5, base 12 retracts to a compact shape for storage and transport.

Base 12 has a first end 22, a second end 24, a first side 26, a second side 28, a front 30, and a rear 32. Base 12 has a longitudinal axis 34, shown in FIG. 2, that extends from first end 22 to second end 24. Base 12 includes a top section 36, a middle section 38, and a bottom section 40. Each of top section 36, middle section 38, and bottom section 40 is a rectangular cuboid. Top, middle, and bottom sections 36, 38, and 40 are approximately the same size as each other. Each of top, middle, and bottom sections 36, 38, and 40 has a depth, or the distance between the front 30 and rear 32, a height, or the distance along the longitudinal axis 34, and a width, or the distance from first side 26 to second side 28. The depth is less than the height and the width. The height and width of each of top, middle, and bottom sections 36, 38, and 40 is approximately the same. It is within the scope of the invention, however, for the shapes, depths, heights, and widths of the top, middle, and bottom sections 36, 38, and 40 to be different than in the embodiment shown in FIG. 1.

In a preferred embodiment, each of top, middle, and bottom sections 36, 38, and 40 has a width of approximately two inches, a height of approximately two inches, and a depth of approximately 0.5 inches. Thus, in a preferred embodiment, the height of base 12 is approximately six inches when base 12 is in the extended position (FIG. 1) and approximately two inches when base 12 is in the retracted position (FIG. 5). Further, in a preferred embodiment, the depth of base 12 is approximately 0.5 inches when base 12 is in the extended position and approximately 1.5 inches when base 12 is in the retracted position. Each of the top, middle, and bottom sections 36, 38, and 40 may also include an outer surface formed of a resilient, tactile material such as rubber to assist in gripping by friction an item that is retained by holder 16.

Figure 4:
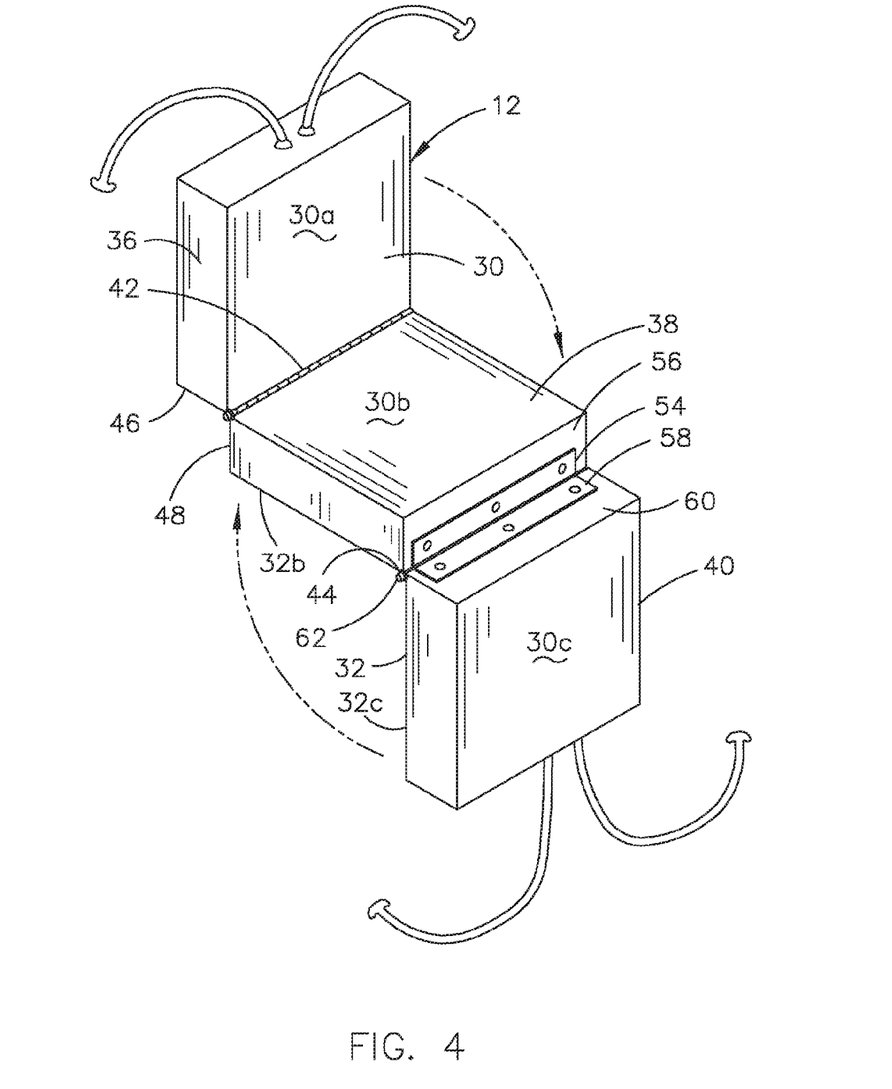
FIG. 4 is a perspective view of the travel media stand of FIG. 1 showing it in a partially retracted position.

Referring to FIG. 4, top section 36 is coupled to middle section 38 with a first hinge 42, and middle section 38 is coupled to bottom section 40 with a second hinge 44. First hinge 42 preferably has a hinge plate (not shown) mounted to a bottom surface 46 of top section 36 and another hinge plate (not shown) mounted to a top surface 48 of middle section 38. First hinge 42 is mounted to top section 36 and middle section 38 adjacent the front 30 of base 12 such that a hinge pin 50 (FIG. 1) is positioned forward of the front 30. The positioning of first hinge 42 allows middle section 38 to rotate 180 degrees with respect to top section 36 into the position shown in FIG. 5 where a front surface 30a of top section 36 abuts a front surface 30b of middle section 38. A locking mechanism 52 (FIG. 1) preferably locks first hinge 42 when base 12 is in the extended position shown in FIG. 1 such that locking mechanism 52 will not allow top section 36 to rotate with respect to middle section 38 until locking mechanism 52 is released. Locking mechanism 52 may also lock first hinge 42 when base 12 is in the retracted position shown in FIG. 5. Locking mechanism 52 includes a button positioned on at least one side of first hinge 42 (and may include buttons positioned on both sides of first hinge 42) that may be pressed by a user to release locking mechanism 52 and allow rotation of top section 36 with respect to middle section 38.

Second hinge 44 preferably has a hinge plate 54 mounted to a bottom surface 56 of middle section 38 and another hinge plate 58 mounted to a top surface 60 of bottom section 40. Second hinge 44 is mounted to middle section 38 and bottom section 40 adjacent the rear 32 of base 12 such that a hinge pin 62 is positioned rearward of the rear 32. The positioning of second hinge 44 allows bottom section 40 to rotate 180 degrees with respect to middle section 38 into the position shown in FIG. 5 where a rear surface 32b of middle section 38 abuts a rear surface 32c of bottom section 40. A locking mechanism 64 (FIG. 1) preferably locks second hinge 44 when base 12 is in the extended position shown in FIG. 1 such that locking mechanism 64 will not allow bottom section 40 to rotate with respect to middle section 38 until locking mechanism 64 is released. Locking mechanism 64 may also lock second hinge 44 when base 12 is in the retracted position shown in FIG. 5. Locking mechanism 64 includes a button positioned on at least one side of second hinge 44 (and may include buttons positioned on both sides of second hinge 44) that may be pressed by a user to release locking mechanism 64 and allow rotation of bottom section 40 with respect to middle section 38. Locking mechanisms 52 and 64 are optional.

As base 12 moves between the extended position shown in FIG. 1 and the retracted position shown in FIG. 5, middle section 38, and bottom section 40 rotate approximately 180 degrees with respect to top section 36, and bottom section 40 rotates approximately 180 degrees with respect to middle section 38. There is a first distance L1 (FIG. 3) between first end 22 and second end 24 when base 12 is in the extended position, and a second distance L2 (FIG. 5) between first end 22 and second end 24 when base 12 is in the retracted position. The second distance L2 is less than the first distance L1. Preferably, the second distance L2 is approximately one third of the first distance L1.

Mount 14 has a first mount hook 66 and a second mount hook 68 that are each rotatably coupled to top section 36 at the first end 22 of base 12. Each of the first and second mount hooks 66 and 68 is generally thin and elongate and extends upward from first end 22 and outward beyond the boundaries of base 12. Each of the first and second mount hooks 66 and 68 is generally shaped as an upside down J. Each of the first and second mount hooks 66 and 68 includes a rounded barb, one of which is identified as 70 (FIG. 2), at its distal end to assist in mounting or hanging the hooks 66 and 68 from an item such as the airplane seatback pocket 18 shown in FIG. 6. First and second mount hooks 66 and 68 may mount to or hang from a variety of different items including, but not limited to, exercise equipment, chairs, cabinet doors, doors, and seatback pockets. First and second mount hooks 66 and 68 are preferably formed from stainless steel that is covered with a resilient, tactile material such as rubber to assist in gripping by friction an item to which first and second mount hooks 66 and 68 are mounted.

Figure 2:
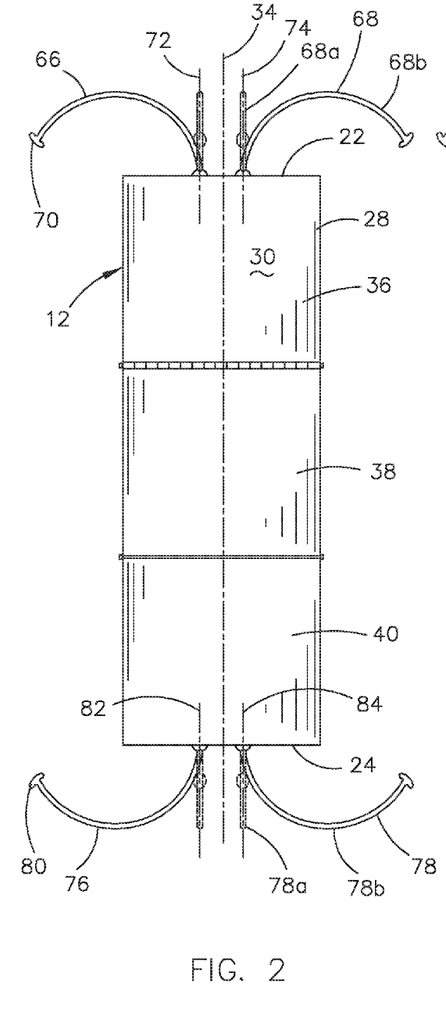
FIG. 2 is a front elevational view of the travel media stand of FIG. 1.
Figure 3:
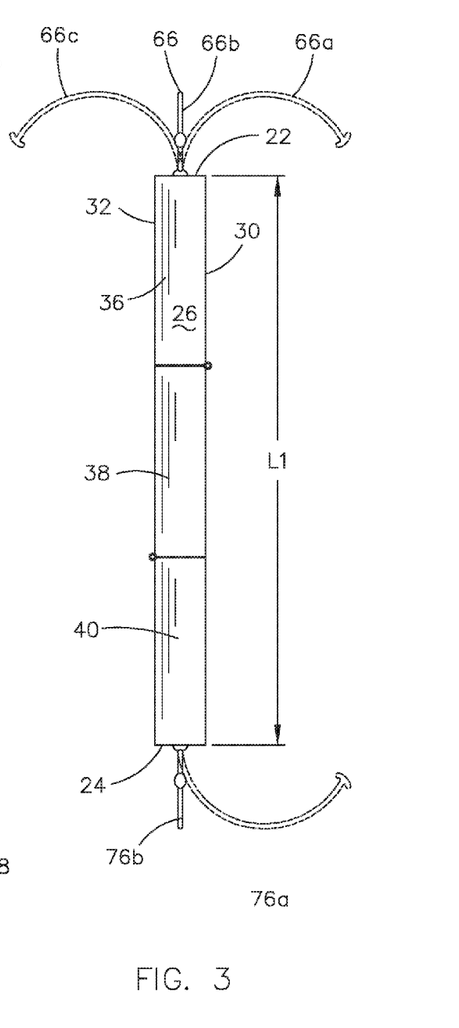
FIG. 3 is a side elevational view of the travel media stand of FIG. 1.

First mount hook 66 is rotatable with respect to base 12 around a first mount axis 72 (FIG. 2) that is generally parallel to the longitudinal axis 34 of base 12. Referring to FIG. 3, first mount hook 66 is operable to rotate between a front position 66a in which it extends outward from the front 30 of base 12, a side position 66b in which it extends outward from the first side 26 of base 12, and a rear position 66c in which it extends outward from the rear 32 of base 12. First mount hook 66 rotates approximately 90 degrees from the front position 66a to the side position 66b and another approximately 90 degrees from the side position 66b to the rear position 66c such that the full range of rotation of front mount hook 66 is preferably approximately 180 degrees from the front position 66a to the rear position 66c.

Second mount hook 68 is rotatable with respect to base 12 around a second mount axis 74 (FIG. 2) that is generally parallel to the longitudinal axis 34 of base 12. Referring to FIG. 2, second mount hook 68 is operable to rotate between a front position 68a in which it extends outward from the front 30 of base 12, a side position 68b in which it extends outward from the second side 28 of base 12, and a rear position (not shown) in which it extends outward from the rear 32 of base 12. In the rear position, second mount hook 68 is generally parallel to the rear position 66c of first mount hook 66, as shown in FIG. 3. Second mount hook 68 rotates approximately 90 degrees from the front position 68a to the side position 68b and another approximately 90 degrees from the side position 68b to the rear position such that the full range of rotation of second mount hook 68 is preferably approximately 180 degrees from the front position 68a to the rear position.

First and second mount hooks 66 and 68 are rotatable so that travel media stand 10 may be mounted to or hung from a variety of different items in different positions as desired by the user. First and second mount hooks 66 and 68 may rotate to any position between the front, side, and rear positions described above. First and second mount hooks 66 and 68 rotate in opposite directions as each other from the front position to the rear position.

Holder 16 has a first holder hook 76 and a second holder hook 78 that are each rotatably coupled to bottom section 40 at the second end 24 of base 12. Each of the first and second holder hooks 76 and 78 is generally thin and elongate and extends downward from second end 24 and outward beyond the boundaries of base 12. Each of the first and second holder hooks 76 and 78 is generally J-shaped. Each of the first and second holder hooks 76 and 78 includes a rounded barb, one of which is identified as 80 (FIG. 2), at its distal end to assist in holding or retaining an item supported by the hooks 76 and 78 such as the mobile phone 20 shown in FIG. 6. First and second holder hooks 76 and 78 may hold or retain a variety of different items including, but not limited to, laptop computers, mobile phones, tablets, e-readers, books, magazines, and newspapers. First and second holder hooks 76 and 78 are preferably formed from stainless steel that is covered with a resilient, tactile material such as rubber to assist in gripping by friction an item that is retained by first and second holder hooks 76 and 78.

First holder hook 76 is rotatable with respect to base 12 around a first holder axis 82 (FIG. 2) that is generally parallel to the longitudinal axis 34 of base 12. Referring to FIG. 3, first holder hook 76 is operable to rotate between a front position 76a in which it extends outward from the front 30 of base 12 and a side position 76b in which it extends outward from the first side 26 of base 12. First holder hook 76 rotates approximately 90 degrees from the front position 76a to the side position 76b.

Second holder hook 78 is rotatable with respect to base 12 around a second holder axis 84 (FIG. 2) that is generally parallel to the longitudinal axis 34 of base 12. Referring to FIG. 2, second holder hook 78 is operable to rotate between a front position 78a in which it extends outward from the front 30 of base 12 and a side position 78b in which it extends outward from the second side 28 of base 12. Second holder hook 78 rotates approximately 90 degrees from the front position 78a to the side position 78b.

First and second holder hooks 76 and 78 are rotatable so that travel media stand 10 may hold and support media of different sizes for display and use. First and second holder hooks 76 and 78 may rotate to any position between the front and side positions described above. First and second holder hooks 76 and 78 rotate in opposite directions as each other from the front position to the side position. Travel media stand 10 may include a bag (not shown) that is sized to receive and contain base 12 when in the retracted position shown in FIG. 5 for convenient storage and transport.

Although base 12 is shown having three sections 36, 38, and 40, it is within the scope of the invention for base 12 to have only two sections or more than three sections. Further, it is within the scope of the invention for base 12 to be moveable between extended and retracted positions in any manner so long as the distance along the longitudinal axis 34 between the first end 22 and the second end 24 is less when base 12 is in the retracted position than when base 12 is in the extended position. Further, it is within the scope of the invention for the mount 14 to be configured differently than a pair of hooks so long as the mount 14 is capable of mounting the travel media stand to a desired item for use. It is also within the scope of the invention for the mount 14 to include just one mount hook 66. Further, the mount hooks 66 and 68 may rotate more or less than 180 degrees. For example, the mount hooks 66 and 68 may only rotate 90 degrees each between the side position and the rear position. It is also within the scope of the invention for the holder 16 to be configured differently than a pair of hooks so long as the holder 16 is capable of holding a desired media item for use. It is also within the scope of the invention for the holder 16 to include just one holder hook 76. Further, the holder hooks 76 and 78 may rotate more or less than 90 degrees. For example, the holder hooks 76 and 78 may rotate 180 degrees each between the front position and a rear position in a similar manner as the mount hooks 66 and 68.

Figure 7:
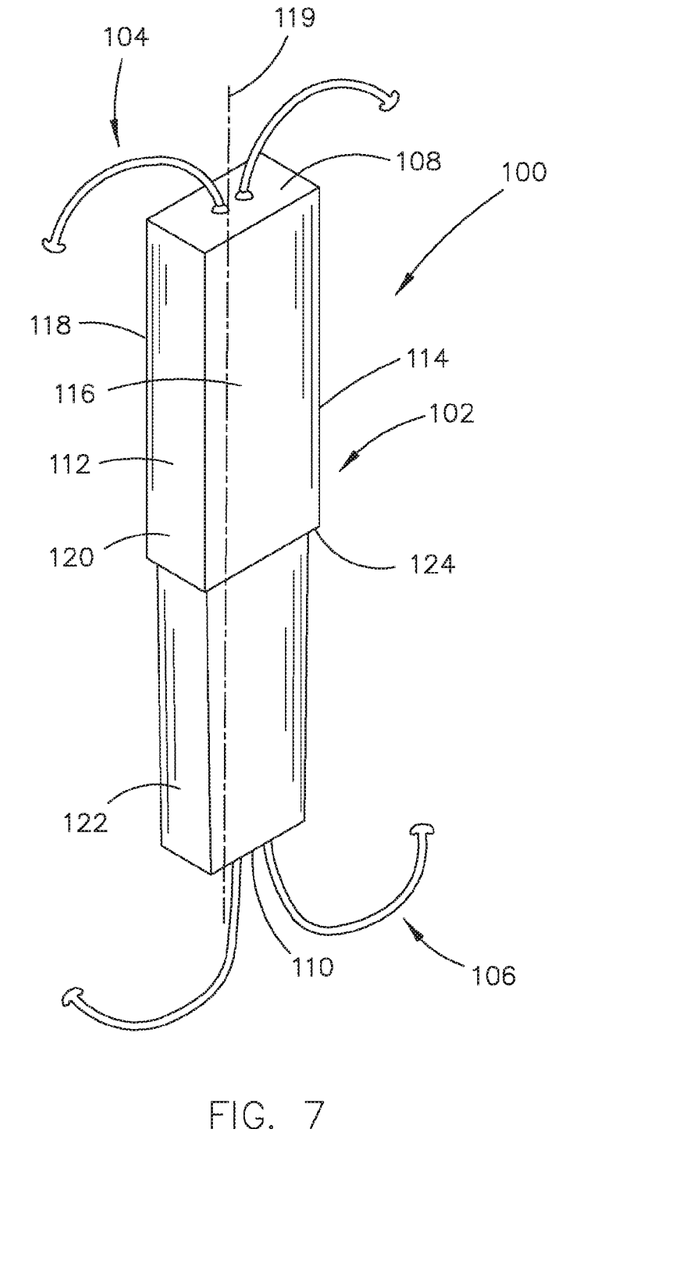
FIG. 7 is a perspective view of an alternative embodiment of travel media stand showing it in an extended position.
Figure 8:
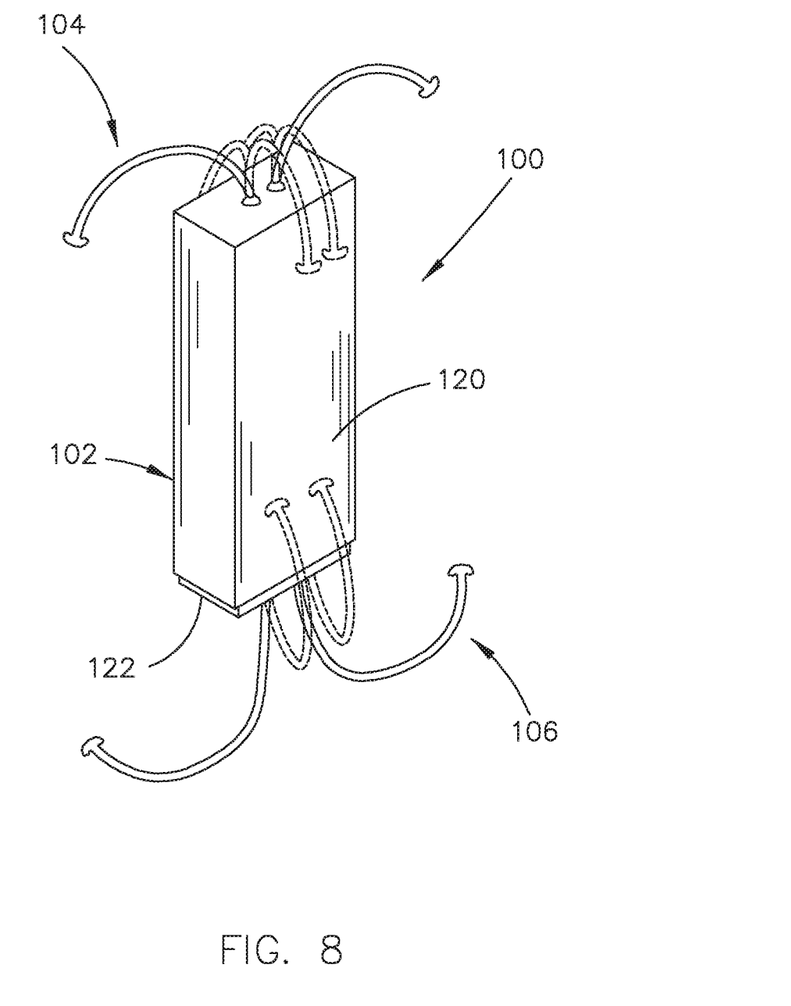
FIG. 8 is a perspective view of the travel media stand of FIG. 7 showing it in a retracted position.

An alternative embodiment of travel media stand in accordance with the invention described herein is identified generally in FIG. 7 as 100. Travel media stand 100 includes a base 102, a mount 104, and a holder 106. Base 102 is moveable between the extended position shown in FIG. 7 and the retracted position shown in FIG. 8. In the extended position, mount 104 can mount to or hang from an item and holder 106 can hold media for display and use. In the retracted position, base 102 retracts to a compact shape for storage and transport.

Base 102 has a first end 108, a second end 110, a first side 112, a second side 114, a front 116, and a rear 118. Base 102 has a longitudinal axis 119 that extends from first end 108 to second end 110. Base 102 includes a top section 120 and a bottom section 122. Each of top section 120 and bottom section 122 is a rectangular cuboid. Bottom section 122 has a depth, or the distance from front 116 to rear 118, that is slightly less than the depth of top section 120. Bottom section 122 also has a width, or the distance from first side 112 to second side 114, that is slightly less than the width of top section 120.

Top section 120 includes a slot 124 with an opening formed in a bottom surface of top section 120 opposite first end 108. Slot 124 is sized such that it can substantially receive all of bottom section 122 when base 102 is in the retracted position shown in FIG. 8. Bottom section 122 is inserted into slot 124 and can slide within slot 124 such that bottom section 122 is moveable with respect to top section 120. Bottom section 122 slides with respect to top section 120 in a direction aligned with the longitudinal axis 119 of base 102. Preferably, bottom section 122 engages a portion of top section 120 within slot such that top section 120 exerts a frictional force on bottom section 122. In order to move bottom section 122 with respect to top section 120, force must be applied to bottom section 122 that exceeds the frictional force exerted on bottom section 122 by top section 120.

Mount 104 and holder 106 of travel media stand 100 have substantially the same structure and operate in substantially the same manner as the mount 14 and holder 16 of travel media stand 10. Thus, mount 104 and holder 106 are not described in detail herein.

In use, base 12 is first unfolded from the retracted position shown in FIG. 5 to the extended position shown in FIG. 1. If locking mechanisms 52 and 64 lock first and second hinges 42 and 44, respectively, when base 12 is in the retracted position, a user first presses the buttons of locking mechanisms 52 and 64 to release the locking mechanisms 52 and 64 and allow for rotation of middle section 38 with respect to top section 36 and rotation of bottom section 40 with respect to middle section 38. After locking mechanisms 52 and 64 are released, middle section 38 is rotated 180 degrees with respect to top section 36 and bottom section 40 is rotated 180 degrees with respect to middle section 38 to move base 12 from the retracted position to the extended position.

Next, the user rotates first and second mount hooks 66 and 68 into a position in which they are capable of mounting or hanging travel media stand 10 from a desired item. For example, if it is desired to hang travel media stand 10 from an airplane seatback pocket 18, shown in FIG. 6, first and second mount hooks 66 and 68 are each rotated from their side position slightly rearward until the distal ends of the first and second mount hooks 66 and 68 may be received by the airplane seatback pocket 18 and the rear 32 of base 12 abuts the outer surface of the airplane seatback pocket 18.

Last, the user rotates first and second holder hooks 76 and 78 into a position in which they are capable of holding or retaining a desired item. For example, if it is desired to hold a mobile phone 20, shown in FIG. 6, first and second holder hooks 76 and 78 are each rotated from their side position slightly forward until the distal ends of the first and second holder hooks 76 and 78 are spaced slightly forward of the front 30 of base 12 by a distance that is approximately equal to the thickness of the mobile phone 20. The mobile phone 20 is then positioned above first and second holder hooks 76 and 78 with its back surface abutting the front 30 of base 12. The mobile phone 20 is slid downward until the bottom of mobile phone 20 contacts the first and second holder hooks 76 and 78. First and second holder hooks 76 and 78 may then be slightly adjusted to securely retain mobile phone 20 between the first and second holder hooks 76 and 78 and the front 30 of base 12. The user may then watch and use the mobile phone 20 hands free.

When it is time to go, the user simply removes the mobile phone 20 from engagement with the travel media stand 10, removes first and second mount hooks 66 and 68 from the airplane seatback pocket 18, presses the buttons of locking mechanisms 52 and 64, and folds base 12 back to the retracted position shown in FIG. 5. In the retracted position, base 12 is in a small, compact shape that may be placed in a bag (not shown) for easy storage and transport.

Travel media stand 100 operates in a similar manner as travel media stand 10 except that base 102 moves between its retracted and extended positions by sliding bottom section 122 with respect to top section 120 as described above.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A travel media stand comprising:
    a base comprising a first end and a second end, wherein a longitudinal axis of the base extends from the first end to the second end, wherein the base is movable between an extended position and a retracted position, wherein there is a first distance between the first end and the second end when the base is in the extended position, wherein there is a second distance between the first end and the second end when the base is in the retracted position, and wherein the second distance is less than the first distance;
    a mount coupled to the first end of the base, wherein the mount is rotatable with respect to the base around a mount axis that is generally parallel to the longitudinal axis; and
    a holder comprising at least one hook that is coupled to the second end of the base, wherein the hook is rotatable with respect to the base around a holder axis that is generally parallel to the longitudinal axis.

2. The travel media stand of claim 1, wherein the base comprises a top section and a bottom section, wherein the mount is coupled to the top section, wherein the holder is coupled to the bottom section, and wherein the bottom section rotates with respect to the top section as the base moves between the extended position and the retracted position.

3. The travel media stand of claim 2, wherein the base comprises a middle section that is coupled to the top section and to the bottom section, wherein the middle section rotates with respect to the top section as the base moves between the extended position and the retracted position, and wherein the bottom section rotates with respect to the middle section as the base moves between the extended position and the retracted position.

4. The travel media stand of claim 3, wherein a first hinge is coupled to the top section and to the middle section, and wherein a second hinge is coupled to the middle section and to the bottom section.

5. The travel media stand of claim 1, wherein the base comprises a top section and a bottom section, and wherein the bottom section slides with respect to the top section in a direction aligned with the longitudinal axis as the base moves between the extended position and the retracted position.

6. The travel media stand of claim 1, wherein the mount is operable to rotate at least approximately 180 degrees with respect to the base around the mount axis.

7. The travel media stand of claim 6, wherein the mount is operable to rotate between a front position in which it extends outward from a front of the base, a side position in which it extends outward from a side of the base, and a rear position in which it extends outward from a rear of the base.

8. The travel media stand of claim 1, wherein the holder is operable to rotate at least approximately 90 degrees with respect to the base around the holder axis.

9. The travel media stand of claim 8, wherein the holder is operable to rotate between a side position in which it extends outward from a side of the base and a front position in which it extends outward from a front of the base.

10. The travel media stand of claim 1, wherein the mount comprises a first hook that is rotatable around the mount axis, wherein the mount comprises a second hook that is rotatable around a second mount axis that is parallel to the longitudinal axis of the base, and wherein the first and second hooks are each coupled to the first end of the base.

11. The travel media stand of claim 10, wherein the first hook is operable to rotate between a front position in which it extends outward from a front of the base, a side position in which it extends outward from a first side of the base, and a rear position in which it extends outward from a rear of the base, and wherein the second hook is operable to rotate between a front position in which it extends outward from the front of the base, a side position in which it extends outward from a second side of the base, and a rear position in which it extends outward from the rear of the base.

12. The travel media stand of claim 1, wherein the holder comprises a second hook that is rotatable around a second holder axis that is parallel to the longitudinal axis of the base, and wherein the first and second hooks are each coupled to the second end of the base.

13. The travel media stand of claim 12, wherein the first hook is operable to rotate between a side position in which it extends outward from a first side of the base and a front position in which it extends outward from a front of the base, and wherein the second hook is operable to rotate between a side position in which it extends outward from a second side of the base and a front position in which it extends outward from the front of the base.

14. A travel media stand comprising:
   a base comprising a first end and a second end, wherein a longitudinal axis of the base extends from the first end to the second end, wherein the base is movable between an extended position and a retracted position, wherein there is a first distance between the first end and the second end when the base is in the extended position wherein there is a second distance between the first end and the second end when the base is in the retracted position, and wherein the second distance is less than the first distance;
   a first mount hook coupled to the first end of the base, wherein the first mount hook is rotatable with respect to the base around a first mount axis that is generally parallel to the longitudinal axis;
   a second mount hook coupled to the first end of the base, wherein the second mount hook is rotatable with respect to the base around a second mount axis that is generally parallel to the longitudinal axis;
   a first holder hook coupled to the second end of the base, wherein the first holder hook is rotatable with respect to the base around a first holder axis that is generally parallel to the longitudinal axis; and
   a second holder hook coupled to the second end of the base, wherein the second holder hook is rotatable with respect to the base around a second holder axis that is generally parallel to the longitudinal axis.

15. The travel media stand of claim 14, wherein the base comprises a top section and a bottom section, wherein the first and second mount hooks are coupled to the top section, wherein the first and second holder hooks are coupled to the bottom section, and wherein the bottom section rotates with respect to the top section as the base moves between the extended position and the retracted position.

16. The travel media stand of claim 15, wherein the base comprises a middle section that is coupled to the top section and to the bottom section, wherein the middle section rotates with respect to the top section as the base moves between the extended position and the retracted position, and wherein the bottom section rotates with respect to the middle section as the base moves between the extended position and the retracted position.

17. The travel media stand of claim 14, wherein the base comprises a top section and a bottom section, and wherein the bottom section slides with respect to the top section in a direction aligned with the longitudinal axis as the base moves between the extended position and the retracted position.

18. The travel media stand of claim 14, wherein the first mount hook is operable to rotate between a front position in which it extends outward from a front of the base, a side position in which it extends outward from a first side of the base, and a rear position in which it extends outward from a rear of the base, and wherein the second mount hook is operable to rotate between a front position in which it extends outward from the front of the base, a side position in which it extends outward from a second side of the base, and a rear position in which it extends outward from the rear of the base.

19. The travel media stand of claim 18, wherein the first holder hook is operable to rotate between a side position in which it extends outward from the first side of the base and a front position in which it extends outward from the front of the base, and wherein the second holder hook is operable to rotate between a side position in which it extends outward from the second side of the base and a front position in which it extends outward from the front of the base.

20. A travel media stand comprising:
   a base comprising a top section, a bottom section, a first end, and a second end, wherein a longitudinal axis of the base extends from the first end to the second end, wherein the base is movable between an extended position and a retracted position, and wherein the bottom section rotates with respect to the top section as the base moves between the extended position and the retracted position;
   a mount coupled to the top section and to the first end of the base, wherein the mount is rotatable with respect to the base around a mount axis that is generally parallel to the longitudinal axis; and
   a holder comprising at least one hook that is coupled to the bottom section and to the second end of the base, wherein the holder is rotatable with respect to the base around a holder axis that is generally parallel to the longitudinal axis.

21. The travel media stand of claim 20, wherein the base comprises a middle section that is coupled to the top section and to the bottom section, wherein the middle section rotates with respect to the top section as the base moves between the extended position and the retracted position, and wherein the bottom section rotates with respect to the middle section as the base moves between the extended position and the retracted position.

22. The travel media stand of claim 21, wherein a first hinge is coupled to the top section and to the middle section, and wherein a second hinge is coupled to the middle section and to the bottom section.

\* \* \* \* \*